United States Patent
Zur

(10) Patent No.: US 7,261,245 B2
(45) Date of Patent: Aug. 28, 2007

(54) ADAPTIVE IRRIGATION OF VEGETATION

(75) Inventor: Benjamin Zur, Tivon (IL)

(73) Assignee: C.I.T. Controlled Irrigation Technologies Ltd., Tivon (IL)

( * ) Notice: Subject to any disclaimer, the term of this patent is extended or adjusted under 35 U.S.C. 154(b) by 145 days.

(21) Appl. No.: 11/328,905

(22) Filed: Jan. 10, 2006

(65) Prior Publication Data
US 2006/0108439 A1 May 25, 2006

Related U.S. Application Data

(63) Continuation of application No. PCT/IL2004/000662, filed on Jul. 20, 2004.

(60) Provisional application No. 60/489,846, filed on Jul. 23, 2003.

(51) Int. Cl.
A01G 25/00 (2006.01)

(52) U.S. Cl. .............. 239/1; 239/63; 239/69; 239/70; 239/200; 700/14; 700/284; 137/78.3

(58) Field of Classification Search ............. 239/69, 239/70, 63, 1, 200; 700/14, 16, 284; 137/78.2, 137/78.3, 624.11; 702/2, 188; 405/37
See application file for complete search history.

(56) References Cited

U.S. PATENT DOCUMENTS

| | | | | |
|---|---|---|---|---|
| 4,176,395 A | * | 11/1979 | Evelyn-Veere et al. | 700/284 |
| 4,209,131 A | * | 6/1980 | Barash et al. | 239/68 |
| 4,646,224 A | * | 2/1987 | Ransburg et al. | 700/14 |
| 4,922,433 A | * | 5/1990 | Mark | 700/284 |
| 4,934,400 A | * | 6/1990 | Cuming | 137/78.3 |
| 5,207,380 A | * | 5/1993 | Harryman | 239/64 |
| 5,341,831 A | | 8/1994 | Zur | |
| 5,621,669 A | * | 4/1997 | Bjornsson | 702/85 |
| 5,740,031 A | * | 4/1998 | Gagnon | 700/16 |
| 5,927,603 A | * | 7/1999 | McNabb | 239/63 |
| 6,079,433 A | * | 6/2000 | Saarem | 137/1 |
| 6,088,621 A | * | 7/2000 | Woytowitz et al. | 700/16 |
| 6,108,590 A | * | 8/2000 | Hergert | 700/284 |
| 6,267,298 B1 | * | 7/2001 | Campbell | 239/70 |
| 6,314,340 B1 | * | 11/2001 | Mecham et al. | 700/284 |
| 6,532,803 B2 | * | 3/2003 | Hutchinson et al. | 73/73 |
| 6,618,673 B2 | | 9/2003 | Zur | |
| 6,937,939 B1 | * | 8/2005 | Shibusawa et al. | 702/22 |

* cited by examiner

Primary Examiner—Steven J. Ganey
(74) Attorney, Agent, or Firm—Frishauf, Holtz, Goodman & Chick, P.C.

(57) ABSTRACT

Adaptive irrigation of vegetation is achieved with a probe implanted into the soil for detecting rootage wetness needs by measuring soil impedance with contacts distributed along the probe. When a dryness threshold indicating rootage needs is met at a depth $Z_{BEGIN}$ previously entered into a control logic coupled to the probe, then irrigation is started. Irrigation is stopped when a wetness front is detected at depth Zend(i) automatically provided by the control logic. The depth of arrest of the drainage front $Z_{final(i)}$ descending below the depth $Z_{end(i)}$ is compared with a depth $Z_{FINAL}$, also previously entered into the control logic. The depth $Z_{end(i)}$ is adapted at each irrigation cycle i for the drainage front to stop at the depth $Z_{FINAL}$. The probe may be used to determine the depth $Z_{BEGIN}$ where resistance drops are detected first, by measuring resistance over time.

32 Claims, 4 Drawing Sheets

ADAPTIVE IRRIGATION OF VEGETATION

The present application claims the benefit of Provisional Application Ser. No. 60/489,846 filed on 23 Jul. 2003 and is a Continuation of PCT/IL2004/000662 filed Jul. 20, 2004.

TECHNICAL FIELD

The present invention relates in general to the automatic irrigation of vegetation by successive irrigation cycles, and in particular, to adaptive irrigation optimization.

BACKGROUND ART

For the benefit of water resources conservation, methods, systems, and devices for optimal irrigation have been developed. Previous U.S. Pat. Nos. 5,341,831 and 6,618,673, issued to the present inventor, are referred to below as, respectively, the '831 patent and the '673 patent, and are incorporated herewith in whole by reference.

The terms water and irrigation fluid, which may contain additives, are used interchangeably.

Even though AC current is applied and impedances are measured, the word resistance is used below and considered to have the same meaning.

Vegetation, plants, and flora are used below as synonyms.

As described in the '673 patent, optimal irrigation wets the soil in the root zone range. Water or irrigation fluid that descends to a depth below the roots of the vegetation is wasted, since all benefit to the plants is lost. Moreover, water penetrating below the roots endangers the water table, which may become polluted by the agrochemicals carried along with the descending water.

At the beginning of irrigation, water descends from the ground level, starting from depth zero, and creates a wetness front that penetrates downwards into the soil. In FIG. 1 of the prior art described in the '673 patent, there is shown vegetation 10 with roots 12. Also illustrated is a probe 26, with electrodes 36, which sense the arrival of an irrigation wetness front created by the descent of the irrigation water into the soil. Sensing is achieved by measuring electrical resistance between two electrodes. The wetter the soil, the lower the resistance, and vice versa. The arrival of a wetness front at a certain depth is thus witnessed by a decrease in resistance measured over the couple of electrodes 36 located at that certain depth.

A first soil depth $Z_I$ indicates the initial depth reached by the wetness front at the time irrigation is halted. Below that depth $Z_I$ the wetness front continues to drain downwards but is now called a drainage front, which comes essentially to a stop at the drainage front arrest depth $Z_F$, or the final drainage depth $Z_F$. In repetitive irrigation cycles, the initial depth $Z_I$ is adaptively adjusted for the irrigation to stop at the depth from where water will drain to reach the depth $Z_F$ but not lower down, which is defined as the bottom of the root zone range, below which water is not beneficial to the plants. Although the purpose of the '673 patent is valid in general terms, the basis for the control of the successive irrigation cycles remains deficient: The '673 patent does not provide a rational criterion related to any plant or rootage associated parameter for commanding the start of a first and of a next irrigation cycle, but waits for an empirical dwell period D between successive irrigation cycles. Such a dwell period D cannot be regarded as a quantitative soil, roots, or wetness driven parameter but is merely a best guess, chosen as an independent absolute time factor.

Furthermore, with the '673 patent no measure are taken for the reset of the impedance measurement taken by the probe 26, which is necessary in response to changing soil and conditions, such as the change of soil resistivity following the use of agrochemicals. A lack of adjustments to the measurements of resistance impairs the adaptive efficiency expected from the successive irrigation cycles.

Moreover, with the '673 patent, the circuitry for sampling the measurements derived from each couple of electrodes 36 distributed on the probe 26 requires massive wiring and a great number of switches, all preventing the realization of cheap and affordable equipment. The term switch, as used below, refers to an electronic switch, even though representation as a mechanical switch is used to ease the description.

For example, as shown for the electric circuit depicted in FIG. 3 of the '673 patent, four couples of electrodes, hence eight electrodes 36, or eight contacts numbered 361 to 368, require eight switches marked SW1 to SW8, to operate in parallel, thus as many switches as electrodes 36, with each switch requiring the necessary accompanying electrical conductors 413.

In other words: with the example above, the eight contacts 36, numbered 361 to 368, define seven measurement intervals. Hence, for n intervals there are needed n+1 switches.

In addition, the structural implementation of the probe 26 of the '673 patent is complex and intricate, and involves multiple production steps, making the probe quite expensive. The probe 26 needs first to be extruded out of insulating material, with electrical leads 68 imbedded therein. Then, a tapered tip 64 is machined, and so are grooves 71 and 74, which are later potted. Next, for each single electrode, a groove 78 is cut, and a conductive band is wrapped inside the groove, and secured by a screw 80. It turns out that the manufacture of a probe 26 is an intricate and expensive process.

DISCLOSURE OF THE INVENTION

The Total Root Zone, or TRZ, is defined as a region wherein 80% of the roots of a plant reside, from ground level down to a TRZ bottom depth. Inside the TRZ there is a Maximum Activity Root Layer, or MARL, with a high root density, where irrigation fluid take up, or wetness absorption from the soil, is intensive and higher than in the other portions of the TRZ. Therefore, it is in the MARL that the roots system, or the rootage, generates dryness by taking up the wetness from the soil. Wetness is considered as being the reciprocal of dryness, thus one over dryness. Each type of vegetation features a specific TRZ bottom depth and MARL layer thickness and bottom.

Logically, it is sound to measure the dryness, or the wetness at a depth selected in the MARL, where the water uptake by the roots is most pronounced, as an indicator reflecting the needs of the rootage of the vegetation in quest for irrigation. The fast removal of wetness from the soil at the MARL-depth is explained by the high density and concentration of roots there, which causes this layer to become the first in need of wetness replenishment. It is therefore at that depth that the changes in soil resistance measured over time are most significant, and provide the best indication regarding the irrigation requirements of the plants. Therefore, soil dryness data is sampled in the MARL, and the depth of the MARL is considered as the "irrigation-begin depth", or $Z_{BEGIN}$, which is viewed as a rational rootage-related parameter.

Such a quantitative root-activity related criterion, which actually justifies starting a new irrigation cycle when a predetermined dryness threshold condition is met, is in contrast with the empirical time delay proposed in the '673 patent. The criterion for starting irrigation is now based solely on a quantitative parameter directly related to and responding to rootage needs. As described below, the irrigation-begin depth is accepted as a manual input entered by a user.

The TRZ depth ranges for various types of plants are values well known to agriculturists and to farmers. When it comes to determine the depth $Z_{BEGIN}$ within the MARL, that depth is either known from experience or the probe is used to locate the depth of maximal water uptake of the roots, as described in detail further below.

It is known that water that descended into the soil S is absorbed rapidly at the searched-for $Z_{BEGIN}$ depth, whereby the soil at the depth $Z_{BEGIN}$ dries up faster and indicates a pronounced increase in resistance over time. Therefore, with resistance measurements taken over time along the depth of the probe, there is a distinct difference of resistance at the depth $Z_{BEGIN}$, which indicates the depth to be selected as a dryness indicator.

To account for changing soil impedance caused by say, the presence of agro-chemicals, the soil wetness detection contacts of the probe are automatically reset and adjusted at each new irrigation cycle, under command of a management and control logic. Thereby, soil impedance parameters are continuously updated, and the probe derives true absolute impedance readings.

The probe provided for use of the method and of the system is capable of continuously measuring impedance, thus of detecting the inset of dryness, or wetness, such as the descent, arrival, and arrest of a wetness front, or a drainage front, in relation to depth along the length of the probe.

Furthermore, the probe is implemented as a structure built as a stack of modular elements, which are easy to assemble, to form a probe as long as desired, and which also enhance measurements quality, at reduced cost.

The system and method for adaptive irrigation of vegetation was tested as a black-box implement in different locations presenting assorted vegetation and various soil properties, namely a golf course with grass, a garden with flowers, a fruit-tree orchard, a vegetable garden, and in a groove of avocado fruit trees grown under supervision of researchers in a governmental agricultural test station. Results and operation cycles were recorded and analyzed. Irrigation water savings achieved ran from 30% to 67%. That is, out of the total quantity of water previously used for irrigation, sometimes up to two thirds were saved. These surprising results are best explained when considering that it becomes possible to utilize water only when dryness conditions at the MARL justify irrigation, and solely for the maintenance of wetness in the depth range of the TRZ.

SUMMARY

It is an object of the present invention to provide a method and a system for adaptive irrigation of vegetation comprising:

a control logic (35) for operating and managing successive cycles i of irrigation, with i=i [0, 1, 2, . . . , n], for a vegetation having a maximum activity root layer, or MARL, spanning a range of soil depth, at least one probe (25) for insertion into the soil (S), each at least one probe having a length and carrying a plurality of contacts (27) longitudinally distributed in spaced-apart parallel alignment for deriving depth-related soil impedance (R) data under command of the control logic, the at least one probe being coupled to the control logic via an electric circuit (29), a controller (31) running the control logic and coupled to command an irrigation valve (41) operative for starting and for stopping irrigation fluid flow to the vegetation to be irrigated, at least one I/O device (33) coupled to the controller and to the control logic, a depth $Z_{FINAL}$ below which a drainage front of the irrigation fluid should not descend, unless if so desired by a user, and a depth $Z_{end(i)}$, at which the flow of irrigation fluid is stopped, and which is adaptively adjusted at each irrigation cycles to converge as a drainage front towards the depth $Z_{FINAL}$, characterized by the steps of:

selecting an irrigation-begin depth $Z_{BEGIN}$ within the range of the MARL, and entering $Z_{BEGIN}$ as a preset parameter into the control logic, operating the control logic to automatically provide a dryness threshold representative of a relative soil dryness condition associated with rootage-driven fluid uptake properties of the vegetation, and opening the irrigation valve when the dryness threshold is detected at the depth $Z_{BEGIN}$, whereby irrigation fluid flow is started in response to wetness uptake properties of the rootage of the vegetation.

The depth $Z_{BEGIN}$, and the depth $Z_{FINAL}$ which is a control objective, are both entered into the control logic via the at least one I/O device to provide rootage-property related depth values necessary for operating and for managing successive adaptive cycles of irrigation It is another object of the present invention to provide soil-impedance derivation in adjustment to changing soil conditions by running an impedance reset operation at least once for each irrigation cycle, which is performed immediately prior to start of irrigation fluid flow.

It is still another object of the present invention to provide a method and a system for deriving soil dryness conditions by measurement of soil impedance between a pair of adjacent contacts at depth $Z_{BEGIN}$. The soil-impedance derivation is kept adjusted to changing soil conditions by running an impedance reset operation after stopping irrigation fluid flow, and after a sufficient time delay directly associated with fluid uptake properties of the roots. That time delay may range between 5 hours and 20 hours, and may lapse after 10 hours.

It is a further object of the present invention to provide a method and a system for deriving the irrigation-begin depth $Z_{BEGIN}$ by help of the probe by taking at least one impedance measurement between each one of the adjacent contacts distributed along the probe, at least once after the irrigation fluid flow is stopped, $Z_{BEGIN}$ being detected within the MARL as a pronounced higher impedance.

It is yet a further object of the present invention to provide a method and a system for the depth $Z_{end(i)}$ at which the flow of irrigation fluid is stopped at the first irrigation cycle i=0, to be optionally entered into the control logic via the at least one I/O device, as any depth along the length of the probe, whereby a drainage front that descends below the depth of the probe for at least one irrigation cycle is an option.

One more object of the present invention to provide a method and a system for the probe to be built as a spike (400) assembled out of a collection of elements selected in combination from the group of modular elements consisting of hollow contact pieces (410), hollow spacers (420), cones (430), and covers (440), each element being configured to provide solid mechanical retention support and firm fastening in longitudinal coextensive succession with an adjacent element. The spike has at least four contact pieces, three spacers, one cone, and one cover, assembled to form one unitary rigid probe, and the hollow contact pieces and the hollow spacers provide a coextensive and unobstructed passage interior to the spike.

Still another object of the present invention to provide a system for the depth $Z_{BEGIN}$ and a depth $Z_{FINAL}$ to be entered into the control logic via the at least one I/O device, as two rootage-property related depth values necessary for operation of adaptive irrigation. The depth $Z_{end(i)}$ is adaptively adjusted by the control logic, at each irrigation cycle, for the irrigation fluid flow to stop at the depth $Z_{FINAL}$.

BRIEF DESCRIPTION OF THE DRAWINGS

In order to understand the invention and to see how it may be carried out in practice, the preferred embodiment will now be described, by way of non-limiting example only, with reference to the accompanying drawings. Furthermore, a more complete understanding of the present invention and the advantages thereof may be acquired by referring to the following description in consideration of the accompanying drawings, in which like reference numbers indicate like features and wherein.

BEST MODE FOR CARRYING OUT THE INVENTION

Figure 2:
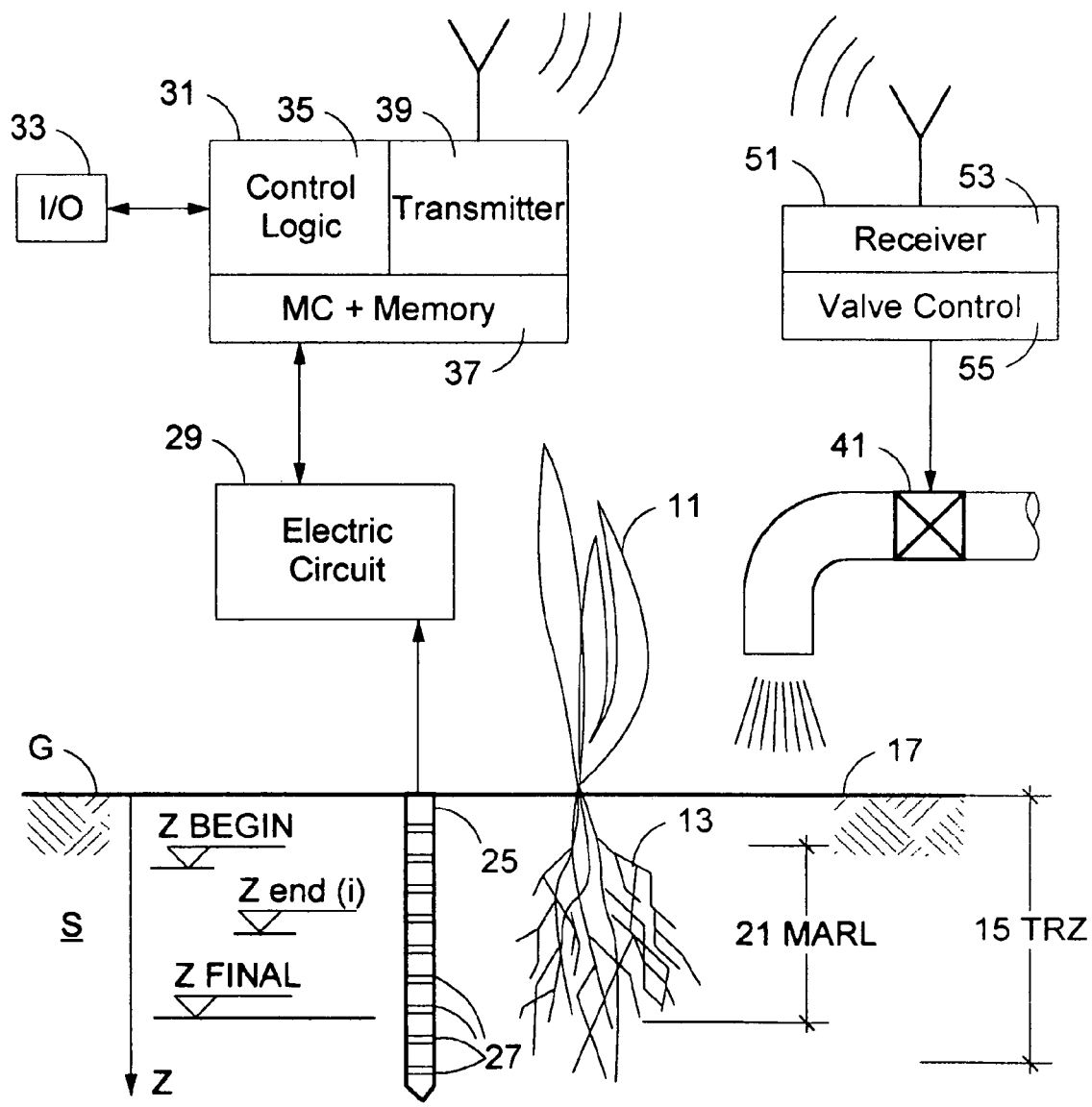
FIG. 2 schematically depicts the present invention.

FIG. 2 is a schematic illustration assisting the description of the method and the system for adaptive irrigation of vegetation. Depth is measured along an axis z, oriented vertically down from the ground level into the soil S. The depths $Z_{BEGIN}$, $Z_{end(i)}$, and $Z_{FINAL}$ appearing in descending order, are referred to below in detail.

Vegetation is depicted as a plant 11 with roots 13 spanning a total root zone TRZ, or 15, from the ground level 17, and down. A maximum activity root layer MARL, or 21, is indicated, wherein a depth $Z_{BEGIN}$ is selected and at which dryness progress is sampled. Dryness at the depth $Z_{BEGIN}$ is indicative of irrigation needs of the rootage and as justifies the start of irrigation. After the irrigation starts, a wetness front, not shown in FIG. 2, descends from the ground level 17, and descends into the depth of the soil S. When the wetness front reaches the depth $Z_{END}$, irrigation is stopped, and the wetness front becomes a drainage front. The bottom depth of the TRZ, defined as a depth $Z_{FINAL}$, is chosen as the drainage front lowest limit, beyond which, for the sake of water savings, irrigation water should not descend, unless if desired.

A probe 25, implanted vertically down into the soil S, carries a plurality of contact rings 27, designated each as contact 27. The contacts 27 are longitudinally distributed in spaced apart parallel alignment, equally spaced if desired, and are used in couples for deriving depth-related soil impedance R, under the command of a control logic. The probe 25 is coupled to an electric circuit 29, which samples readings derived from the probe 25, and is further coupled to a controller 31. The controller 31 operates with a micro processor 37 coupled to a memory, to a control logic computer program 35, and to a transmitter 39. The transmitter 37 sends signals to one or more remote units 51 having receiver(s) 53. Each one of the receiver(s) 53 is coupled to and in control of at least one irrigation valve 41 operated via a valve control 55. The controller 31 is also linked to and commands one or more I/O devices 33. It is noted that a PC is also regarded as an I/O device.

Although not shown in the Figs., the controller 31 may also be equipped with a receiver for accepting data and commands from remote locations. Wires may also be used instead of wireless transmission, such as RF, to couple between the controller 31 and the at least one valve control 55, or with any other remote station.

The terms "probe" 25, "irrigation valve" 41, "remote unit" 51, "receiver" 53, and "valve control" 55 refer to either the singular or the plural.

In operation, the controller 31 orders the sampling of data via the electric circuit 29, with readings being taken by the contacts 27 of the probe 25. When the controller 31 detects that a dryness threshold at the MARL-depth is met, thus at the depth $Z_{BEGIN}$, then the controller 31 commands the opening of the irrigation valve(s) 41. Irrigation of the ground 17 causes a wetness front to descend into the soil S downwards.

A few examples of the range of the deepest roots in the TRZ, above which the depth $Z_{BEGIN}$ is chosen, are illustrated in Table 1 below.

TABLE 1

| Type of vegetation | Representative TRZ-depth [centimeters] |
|---|---|
| Carrots | 10–20 |
| Grass | 20–40 |
| Avocado tree | 30–50 |
| Citrus fruit trees | 35–55 |
| Cotton | 80–100 |

After an irrigation cycle is started, and once the probe 25 returns data indicative of the detection of the wetness front at the depth $Z_{END}$, located above $Z_{FINAL}$, then the controller 31 commands closure of the irrigation valve(s) 41. Closure occurs when the irrigation end-threshold is met. The aim is to stop the flow of irrigation water at a target depth $Z_{END}$, which the controller 31 successively adapts at each irrigation cycle, for a drainage front to come to a rest at the depth $Z_{FINAL}$. The depth $Z_{FINAL}$ is a control objective of the control logic 35. In practice, for an irrigation cycle i, with i=i [0, 1, 2, 3, . . . , n], and for an irrigation-end depth $Z_{end(i)}$ the drainage front reaches a depth $Z_{final(i)}$, which is different from the target depth $Z_{FINAL}$. As explained in the '673 patent, the depth $Z_{FINAL}$ is reached by successive adaptive corrective steps of the depth $Z_{end(i)}$ taking place once at each successive irrigation cycle i.

It is noted that the depth $Z_{END}$ can reside anywhere in the range of the TRZ, and that the depth $Z_{FINAL}$ is either the depth of the deepest roots in the TRZ or another depth, selected as desired by a user. As described below, the user usually enters the depth $Z_{FINAL}$ manually.

The method and the system for the adaptive and optimal irrigation of vegetation 11 is run and managed by the control logic 35, the main program steps of which are listed below in Table 2.

TABLE 2

| SET | Step No. | Manual/Automatic Step | Details |
|---|---|---|---|
| I | 0.1 | Enter Y | Dryness factor ranging from 1.1 to 2.5 |
| | 0.2 | Enter T | Front factor ranging from 0.9 to 0.95 |
| | 0.3 | Enter $Z_{BEGIN}$ depth | Dryness-depth for irrigation start |
| | 0.4 | Enter $Z_{FINAL}$ | Drainage front arrest depth |
| | 0.5 | Option: enter initial $Z_{end(0)}$: | Desired irrigation-end depth |
| II | 0 | Set irrigation cycle # to i = 0 | Start of automatic operation |
| | 1 | Set $Z_{end(i)}$ by default | Only if not entered above in step 0.5 |
| | 2 | Measure R(i) on all contacts but not at depth $Z_{BEGIN}$ if i ≠ 0 | Resets resistance measurements before irrigation start |
| | 3 | Calculate R(i) *Y and save | Threshold for $Z_{BEGIN}$-depth detection |
| | 4 | Calculate R(i) *T and save | Threshold for wetness and drainage front detection for all contacts. |
| III | 6 | Start irrigation | For irrigation cycle i |
| | 7 | Sample probe & detect $Z_{end(i)}$ | Arrival of wetness front to $Z_{end(i)}$ depth |
| | 8 | End irrigation at $Z_{end(i)}$ | When wetness front is detected |
| IV | 9 | Set i = i + 1 | For next irrigation cycle |
| | 10 | Sample and detect $Z_{final(i-1)}$ | Drainage front stop depth |
| | 11 | Adjust $Z_{end(i)}$ accordingly if $Z_{final(i-1)}$ ≠ $Z_{FINAL}$ | $Z_{end(i)}$ is increased if $Z_{end(i-1)} < Z_{FINAL}$<br>$Z_{end(i)}$ is decreased if $Z_{end(i-1)} > Z_{FINAL}$<br>$Z_{end(i)}$ is unchanged if $Z_{end(i-1)} = Z_{FINAL}$ |
| | 12 | Measure and save R(i) at $Z_{BEGIN}$, 10 hours after step 6 | As reference resistance for next irrigation cycle start |
| | 13 | Calculate R(i)*Y, sample and detect $Z_{BEGIN}$ | Detects dryness threshold for $Z_{BEGIN}$ |
| | 14 | GO TO step 2 | To start next irrigation cycle |

The control steps are divided in four sets, listed from set I to set IV. In a first preliminary set I, a few parameters are manually entered before the start of the other three automatic sets controlling the succession of irrigations cycles. The second set II starts the automatic operation of the control logic by entering a default irrigation-end depth if not previously entered manually, and resets the electric conductivity values of the contacts 27 on the probe(s) 25, according to the actual soil conditions. The third set III controls the beginning and the end of the flow of irrigation water. The last set IV contains steps for detection of the depth of arrest of the drainage front, for detection of conditions justifying the start of a new irrigation cycle with an adapted irrigation-end depth $Z_{END}$ if required, and for the return of control to set II.

In set I all steps are entered manually. There are four or five steps, the fifth step being optional.

Set I starts with step 0.1, where a dryness factor Y ranging from 1.1 to 2.5 is entered. The dryness factor Y is used for determining the increase of resistance, which is a criterion for commanding the start of irrigation fluid flow. When the vegetation is sensitive to immediate irrigation, the small values of Y are used, but when irrigation may be delayed, larger values are entered.

The second step 0.2 in set I, is for entering a front factor T ranging from 0.9 to 0.95, according to the soil texture. Front factor T is used for the tracking of a wetness, or a drainage front.

At step 0.3 of set I, the depth $Z_{BEGIN}$ is entered via an I/O device 33. $Z_{BEGIN}$ is a depth in the MARL where dryness is sensed. The '673 patent was unable to allow the selection of an efficient depth $Z_{BEGIN}$ and there was no rational rootage-related criterion to detect a dryness threshold value justifying the beginning of irrigation fluid flow.

At step 0.4 of set I, the depth $Z_{FINAL}$ is entered according to the depth of the bottom of the TRZ, below which irrigation water is just wasted.

If desired, any depth $Z_{end(i)}$ is manually entered by the user at step 0.5, even as deep as the depth $Z_{FINAL}$, or lower down, such as for soil flushing purposes. Thus, the depth $Z_{end(i)}$, for i=0, is where the flow of irrigation fluid is stopped at the first irrigation cycle i=0, is optionally entered into the control logic via an I/O device 33. Else, the depth $Z_{end(i)}$ is provided by default.

It is noted that when the depth $Z_{end(i)}$ is chosen for example as the deepest depth measurable by the probe 25, then the drainage front will come to a rest below the length of the probe, even below $Z_{FINAL}$. The descending drainage front will thus flush the soil S in depth. However, the depth $Z_{end(i)}$ will gradually ascend since it is adjusted at each irrigation cycle i towards the control target $Z_{FINAL}$. Hence, the depth $Z_{end(i=0)}$ may be set to any depth along the length of the probe, whereby there is an option for a drainage front to descend below the depth of the probe for at least one irrigation cycle, or more irrigation cycles, before being automatically adapted to return above the depth $Z_{FINAL}$.

Set II starts the operation of the adaptive irrigation in step 0, being the first of the automatic sets II, III, and IV. At step 0 of set II the cycle number i is automatically set to zero as i=0. Then, in step 1, the depth of arrest of the first cycle of irrigation $Z_{end(0)}$ is automatically set by default if that same depth was not previously entered manually at step 0.5 in set I. For example, $Z_{end(0)}$ is set to three contact rings above the depth $Z_{FINAL}$, or about 15 to 30 cm above that last depth.

It is in step 2 of set II that the impedance, or the resistance R(i) of each contact ring 27, or contact 27 is measured. As will be described below, the resistance measurements at the contacts 27 selected for measuring the depth $Z_{BEGIN}$ are reset for irrigation cycles with i>0. Then in step 3, a dryness threshold value R(i)*Y is calculated, saved and stored for the contact rings at depth $Z_{BEGIN}$. The dryness threshold serves for the detection of the soil dryness at the depth $Z_{BEGIN}$.

In step 4 of set II, a front threshold value R(i)*T is calculated, and saved for use with the detection of a wetness front arrival such as an irrigation-end front, or a drainage front.

Set III starts the irrigation cycle i of the soil-dryness-measurement driven irrigation process, in step 6. The probe 25, described below, then samples the arrival of the descending wetness front to the irrigation-end depth $Z_{end(i)}$ in step 7.

When the threshold for accepting arrival of the wetness front is detected at depth $Z_{end(i)}$, thus when the irrigation-end threshold is met, then the irrigation fluid flow is stopped in step 8. From then on, the wetness front descends as a drainage front.

If desired, the depths $Z_{end(i)}$ of each irrigation cycle i are displayed on an I/O devices 33. Any other data, measured, or entered, or calculated, may also be displayed or transmitted to remote stations by the transmitter 39 mounted in the controller 31.

Set IV, which is the last set of control commands, evaluates the actual irrigation cycle i and adjusts values in the logic control 35, or adaptive learning process, for the next irrigation cycle i+1.

In step 9 of set IV, the cycle counter is incremented by one, to i=i+1. In step 10 the depth of $Z_{final(i-1)}$ is measured, and adjusted, in step 11, in adaptive improvement towards the depth $Z_{FINAL}$. Thus, if the depth $Z_{end(i-1)}$ is measured and found to be above the depth $Z_{FINAL}$, then the depth of $Z_{end(i)}$ is increased to descend deeper, and vice versa. Otherwise, when $Z_{final(i-1)}$ equals $Z_{FINAL}$, then no adjustment takes place. It is noted that step 9 may be listed and take place below step 11.

Although in set IV the steps 12 and 13 are listed below steps 9 to 11, the former steps which operate independently of the latter steps, are related by a time delay, of say 10 hours, to step 6 of set III.

A reference resistance R(i) for use as a reset resistance value for dryness condition detection with the next irrigation-begin command is measured at depth $Z_{BEGIN}$ and saved in step 12, some 10 hours after sending the last irrigation-begin command. It is assumed that an irrigation cycle lasts for much less than 10 hours, and that 10 hours are long enough a period of time for the wetness absorption by the roots in the MARL. If desired, any other practical time delay, other than 10 hours, is chosen.

In step 13 the control logic calculates the irrigation start threshold R(i)*Y and starts to sample for the detection of the dryness threshold at the depth $Z_{BEGIN}$. When that threshold is detected, control passes to step 2 of set II, via step 14. Then, the resistance or impedance of contacts 27 is reset prior to irrigation, should soil conditions have changed, and the flow of control continues.

Figure 3:
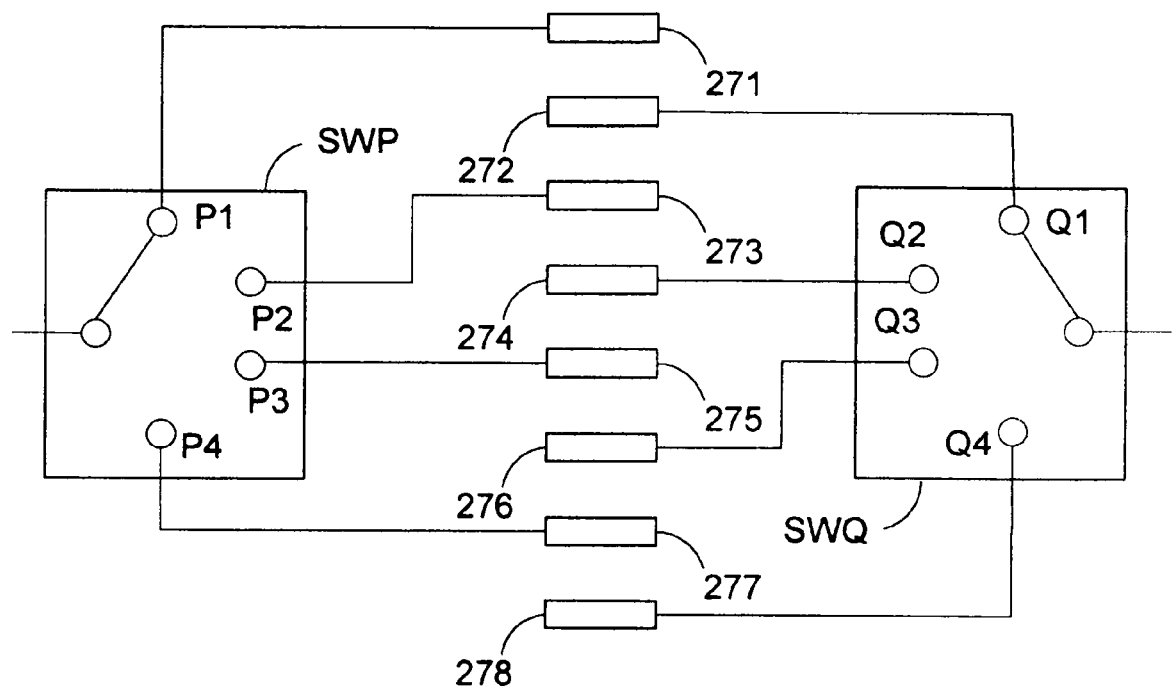
FIG. 3 shows a detail of the switching circuit out of the electrical circuitry.

In FIG. 3, a portion of the electric circuit 29 referring to the switching circuitry is shown schematically with for example, eight contacts 27 numbered from 271 to 278, ordered in alignment on a probe 25, which is not depicted in the Fig. The eight contacts 271 to 278 define seven consecutive depth-measuring intervals, each interval being disposed between two adjacent individual contacts 27.

Figure 4:
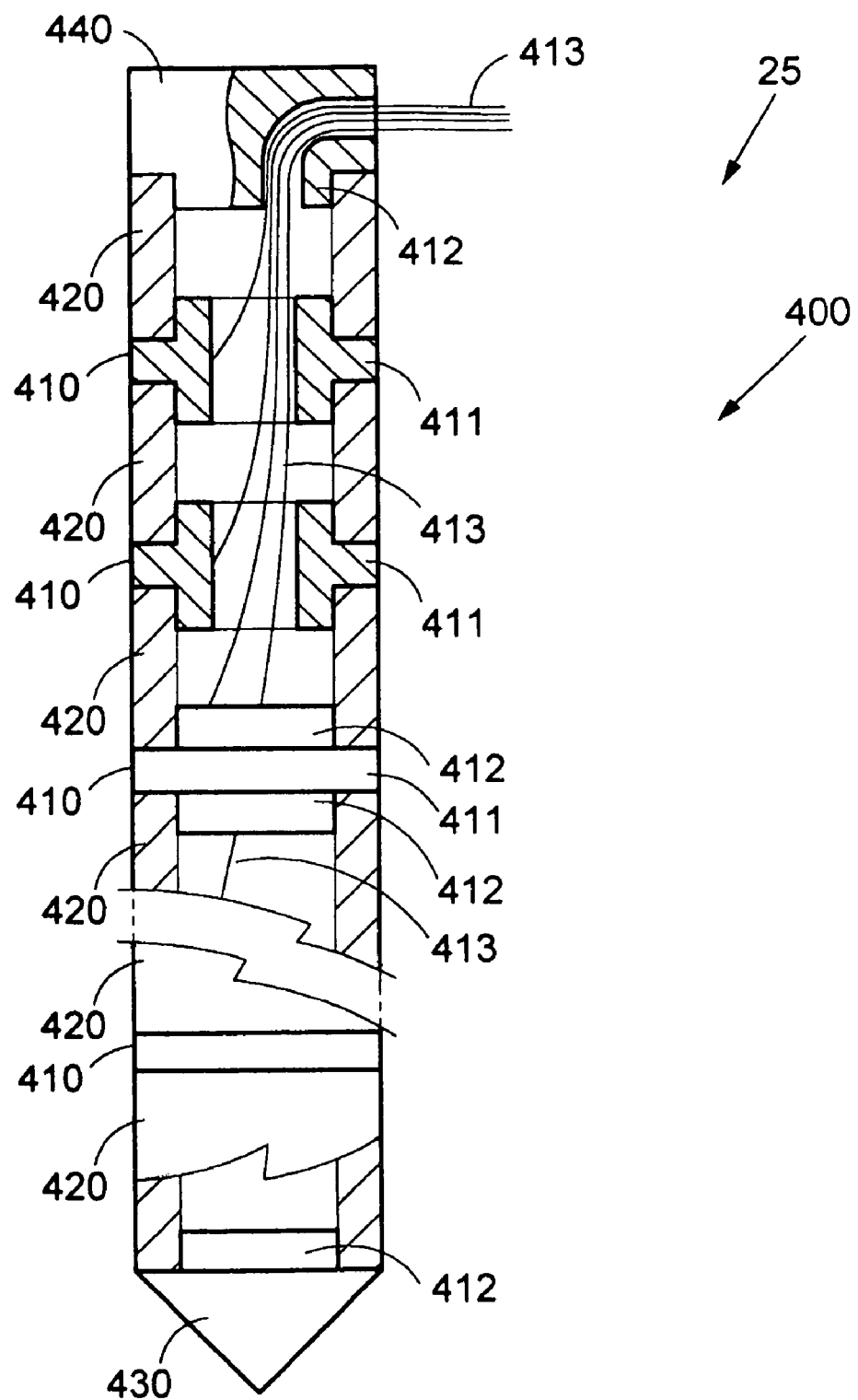
FIG. 4 illustrates details of the probe.

It is practical to limit a depth measuring system to readings taken between any two sequentially adjacent individual contacts 27, to simplify the circuitry without impairing performance. This means that measurements are performed between the couples of contacts 271 and 272, 272 and 273, and so on, until 277 to 278. To take readings from the couples of contacts 27, two independently operating multi-position switches SWP and SWQ are provided, each switch having one switching position coupled to one contact 27. For eight contacts 27, two switches SWP and SWQ, each one with four switching positions suffice, since one position is coupled to one contact 27. As remarked above, the term switch refers to an electronic switch, even though mechanical switch terminology is used for the ease of illustration. The four positions of switch SWP, namely P1, P2, P3, and P4, and the four positions of switch SWQ numbered from Q1 to Q4 are shown in FIG. 4. To read the first couple of contacts 271 and 272, the switch SWP is set to point P1, and the switch SWQ is set to point Q1. Likewise, the second couple of contacts 272 and 273 require the first switch SWP to be set to P3, while the second switch SWQ remains at Q2. Further couples of contacts are selected in the same manner.

If the intervals between the individual contacts 27 are designated as n, and n is an odd integer, then for n+1 contacts only two independent multi-point switches, SWP and SWQ each with (n+1)/2 positions are necessary for the switching between the consecutive contacts 27. Should n be an even integer, then one switch out of both switches SWP and SWQ should carry n/2 positions and the second switch should have n/2+1 positions.

Two independent multi-point switches SWP and SWQ totaling n positions permit to achieve a much simpler circuitry in comparison with the '673 patent, which required a number of n switches operating in parallel.

With the electrical circuit 29 under command of the control logic 35, the probe 25 is able to sample, track, and detect dryness or wetness along its entire length.

With reference to FIG. 4, the probe 25 is built as a spike 400, thus as a straight longitudinal axi-symmetric slender body of uniform cross-section. A spike is assembled from elements selected out of four groups of modular elements, namely contact pieces 410, separators 420, cones 430, and covers 440. Each element is configured to provide solid mechanical retention support and firm fastening in longitudinal coextensive succession with an adjacent element. If desired, the cross-section of the probe is circular, but any other shape may be selected.

As the name implies, a contact piece 410 is dedicated to make contact with and to permit measurement of the impedance of the soil S. A contact piece 410, made from electrically conductive material, is a straight bushing with a bushing body 411 as a middle-portion, and a collar 412, also hollow, disposed in coaxial alignment and in symmetry to each side of the bushing body 411. In practice, an electrical conductor 413 connected to the electric circuit 29, which is not shown in FIG. 4, is coupled to each contact piece 410 before structural assembly is started, for ease of further integration.

A contact piece 410 is assembled with a spacer 420 by insertion therein of a collar 412. A spacer 420, built from electric insulating material, is a tube with two open-ended extremities used to electrically isolate a contact piece 410 from another contact, or from a cone 430, or from a cover 440. Each spacer 420 receives two collars 412, one at each open-end extremity. When stacked together, the collection of modular elements from which the spike 400 is formed becomes a closed self-supporting rigid and solid unitary probe, with a co-extensive exterior surface, and an unobstructed interior passage.

If desired, both the cone 430 and the cover 440 are made out of conductive material to become contact pieces 410 when electrically coupled to the electric circuit 29. Thereby, two more depth-measuring intervals are added to the probe 25. For example, when the cross-section of the spike is circular, then the spike 400 has a cylindrical exterior surface and an interior passage, which is either cylindrical, with a circular cross-section, or with any other desired cross-section. Longitudinally assembled contact pieces 410 and spacers 420 provide an unobstructed continuous internal passage for electrical conductors 413 that wire the contact pieces 410 to the electric circuit 29.

A cone 430 presents a conical first extremity shaped for penetration into the soil S, and a second extremity with a collar 412 configured to be received by the open end extremity of a separator 420. Unlike the contact pieces 410, the collar 412 of the cone 430 is not necessarily hollowed out.

The cover 440, or cap 440, has a flat top at one end, and at a second end, a collar 412 for reception by a spacer 420. In contrast with the other elements of the spike 400, the cover is not axi-symmetric, but is provided with an exit duct 421 for communication from the collar 412 to a cover outlet 422 entered in perpendicular to the axial direction of the spike 400. Individual conductors 413 are each one coupled to one contact piece 410, and pass from the inside of the assembled spike 400 into the hollow collar 412 of the cover 440, to emerge via the exit duct 421, on the exterior of the spike 400.

In practice, it is possible to assemble a spike 400 by stacking a spacer 420 on top of a cone 430, and on top thereof, a contact piece 410 pertaining to a succession of as many element-couples as desired, each element-couple having a spacer 420 attached to a contact piece 410. To complete the spike 400, a top 440 is coupled to the uppermost, or last added spacer 420.

The collars 412 sealingly fasten the succession of modular elements together, either by pressure fit, friction, screwthread assembly, bonding, gluing, or by any other fastening method or combination thereof known to the art. When the outlet 422 is potted, the interior of the spike 400 is sealed.

In total, a spike 400 with four contact pieces 410, with an electrically insulating cone 430 and cover 440, requires five spacers 420. The uppermost contact piece 410 is topped with a last spacer 420, which in turn, receives a cover 440 to complete the construction. When the cone 430 and the cover 440 are electrically conductive to serve as contacts 27, then three spacers 420 suffice.

The more element-couples of contact pieces 410 and of spacers 420 are stacked together for the same probe, the longer the spike 400. A spike 400 may be built to have a length appropriately adapted to different plants, as listed in Table 1. Carrots, with an TRZ about 15 cm deep, will require only a relatively short spike 400, while for cotton, with an TRZ that is some 100 cm deep, the spike 400 will become rather long.

Evidently, the less contact pieces 410 on a probe 400, the less electrical conductors 413, the cheaper the wiring and the assembly, and therefore, the less expensive the spike 400. A probe 400 may remain in permanent use continuously, or may be utilized temporarily as a detection probe during a first parameter-detection period, and be replaced later by a permanent dedicated probe.

For example, in a new location with a certain climate, a given type of soil S, and a certain type of vegetation 11, a probe 400 equipped with many contact pieces 410 is implanted as a detection probe for a few months, for exploration purposes. After a while, once the parameters of the combined properties, such as climate, soil S, and vegetation have been mapped, and the drainage front arrest depth, or drainage-depth is known, then the detection probe is possibly replaced with a cheaper dedicated probe carrying only a minimal amount of, but not less than four contact pieces 410.

A long spike 400 carrying only a small number of contact pieces 410 is possibly implemented in two different ways.

First, it is possible to use custom-cut lengths of electrically insulating tubing instead of the modular fixed-length spacers 420, with the custom-cut tubing being selected as any desired length. Second, one may replace an electrically conductive contact piece 410 by a replica thereof having the same dimensions, but made as an electrically insulating dummy-contact, to assemble a spike 400 as long as desired, but with less contact pieces 410.

With the probe 25, a plurality of contacts 27 are longitudinally distributed in spaced-apart parallel alignment for deriving depth-related soil impedance (R) data from the soil under command of the control logic. The beginning and the end of irrigation are controlled by the detection of changes in the resistance, such as a change caused by dryness, by the descent of a wetness front, or of a drainage front.

Figure 1:
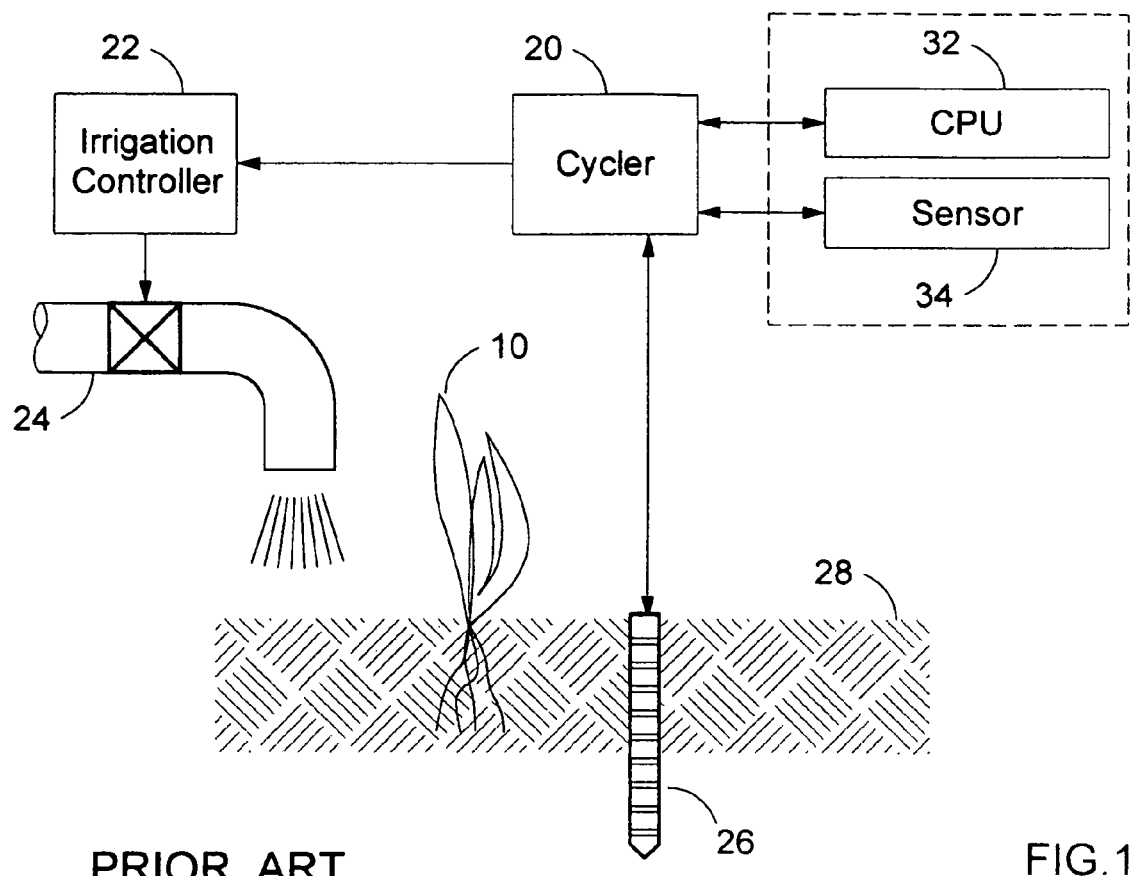
FIG. 1 is an illustration of the prior art.
Figure 5:
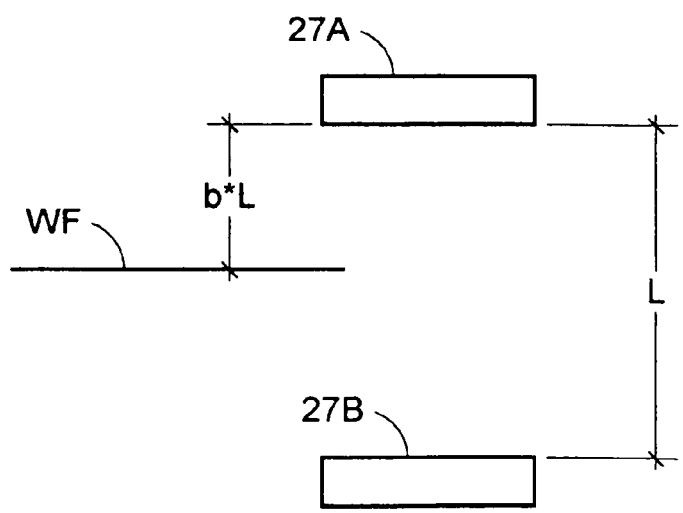
FIG. 5 is a schematic detail of a couple of contacts.

In FIG. 5, a single couple of contacts 27A and 27B, with contact 27A disposed above contact 27B, and separated by a known distance L, are considered in relation with a descending wetness front WF. It is assumed that before irrigation, thus when the soil is relatively dry before the inset of a wetness front WF, the measured initial resistance is R Ohms per unit of distance separating both contacts. The initial resistance between the couple of contacts 27A and 27B is thus equal to R*L. For an incoming wetness front WF, at a depth below contact 27A, that resistance diminishes to a*R Ohms, with a<1.

The situation is described for the case when the wetness front WF has descended only a portion b of the distance L separating the couple of contacts 27A and 27B, with b<1.

The current resistance is then:

$$\text{Current resistance} = a*b*L*R + (1-b)*L*R, \text{ or}$$
$$= (a*b + (1-b))*R*L$$

The ratio between an incoming wetness front WF and the initial resistance is thus:

$$\text{Ratio} = \frac{\text{Current resistance}}{\text{Initial resistance}} \quad (1)$$
$$= 1 + b(a-1)$$

The value of this ratio drops with the onset of irrigation, and is compared to a limit value c<1. Ratio values c lower than the limit indicate an event such as the arrival of a wetness front WF. Hence, measured ratios lower than c indicates the arrival of a wetness front. Typical values are c=0.95, and a=0.5. After inserting 1−0.5*b<0.95 into the ratio equation (1), one obtains b=0.1. This means that an event is detected when descending somewhat lower below the upper contact 27A, more precisely, 10% below the upper contact 27A.

The direct implication is that when the distance L between two contacts 27A and 27B is increased from 10 mm to 50 mm, then the depth of detection will increase by only 4 mm. The conclusion is thus that the probe 25 is able to detect a descending wetness front WF when that last one drops somewhat below the upper contact 27A out of a couple of contacts 27A and 27B. Therefore, the distance L selected for the separation between the contacts 27A and 27B is not critical.

Positioning of the system in the field is identical to the description given in the '673 patent. However, operation is different.

The system is operated by entering commands required by the steps of set I in Table 2. Then, automatic irrigation proceeds, based on the wetness or water needs of the roots of the plants 11, as measured at depth $Z_{BEGIN}$. That last depth is entered a priori into the control logic 31, either from experience, or as a result of measurements taken with the probe 25. Such measurements are performed after irrigation, by taking resistance readings over all the couples of contacts 27, at various occasions distanced apart by about half an hour to one hour. A soil-depth versus resistance graph of the TRZ will show were the resistance increases fastest, which is were wetness uptake is most pronounced, and therefore, indicates the depth $Z_{BEGIN}$ in the MARL.

In use, data may be derived from the system as for example, a graph of the successive $Z_{end(i)}$ depths associated with each irrigation cycle i. The depth $Z_{end(i)}$ is measurable over anyone of each couple of adjacent contacts 25. Such a graph will show the adaptations entered by the control logic 35 to the various $Z_{end(i)}$ depths. Likewise, one may desire to plot the depths $Z_{final(i)}$ related to each depth $Z_{end(i)}$ over a series of irrigation cycles i to contemplate the convergence of $Z_{final(i)}$ to $Z_{FINAL}$.

It will be appreciated by persons skilled in the art, that the present invention is not limited to what has been particularly shown and described hereinabove. For example, a controller 31 is possibly linked to a plurality of probes 25 and of irrigation valves 41. However, the controller 31 is possibly coupled via a receiver not shown in FIG. 2, to a remote control logic 35. Also, the probe may carry contacts 27 that are distributed in parallel at equal or unequal distance from each other. Rather, the scope of the present invention is defined by the appended claims and includes both combinations and subcombinations of the various features described hereinabove as well as variations and modifications thereof which would occur to persons skilled in the art upon reading the foregoing description.

The invention claimed is:

1. A method for adaptive irrigation of vegetation including:
- a control logic for operating and managing successive cycles i of irrigation, with i=i [0,1,2, . . . ,n], for a vegetation having a maximum activity root layer (MARL) spanning a range of soil depth,
- at least one probe for insertion into the soil, each at least one probe having a length and having a plurality of contacts longitudinally distributed in spaced-apart parallel alignment for deriving depth-related soil impedance data under command of the control logic, the at least one probe being coupled to the control logic via an electric circuit,
- at least one I/O device coupled to the control logic and allowing a user to input data,
- a controller running the control logic and coupled to command both the at least one I/O device and an irrigation valve operative for starting and for stopping irrigation fluid flow to the vegetation to be irrigated, respectively at a depth $Z_{BEGIN}$ and at a depth $Z_{BEGIN}$, wherein:
- both $Z_{BEGIN}$ and $Z_{end(i)}$, are initial values entered as either one of both a user input or a default value, with $Z_{BEGIN}$ being disposed within the range of the MARL, and
- the depth $Z_{end(I)}$ corresponding to a depth above a depth $Z_{FINAL}$, which is the depth below which a drainage front of the irrigation fluid should not descend, unless if so desired by a user,
the method comprising the steps of:
- operating the control logic through the successive cycles i of irrigation for:
- accepting the irrigation-begin depth $Z_{BEGIN}$ as an initial value for a first cycle of irrigation, and in next cycles of irrigation, to derive from the at least one probe a depth $Z_{BEGIN}$ by taking resistance readings over all of the plurality of contacts to detect where changes in soil resistance measured over time increase fastest, which is where wetness uptake is most pronounced and indicates the depth $Z_{BEGIN}$, and for
- accepting the depth $Z_{end(i)}$, as an initial value for a first cycle of irrigation, and in next cycles of irrigation, deriving from the at least one probe a depth $Z_{end(i)}$ which is adaptively adjusted at each irrigation cycle to converge towards the depth $Z_{FINAL}$ until reached,
whereby irrigation fluid flow is started in response to wetness uptake properties of the rootage of the vegetation in the MARL, and stopped before the drainage front reaches the depth $Z_{FINAL}$.

2. The method according to claim 1, wherein:
the depth $Z_{BEGIN}$, and the depth $Z_{FINAL}$ which is a control objective, are both entered as either one of both a user input into the control logic via the at least one I/O device and a default values, to provide rootage-property related depth values necessary for operating and for managing successive adaptive cycles of irrigation.

3. The method according to claim 1, wherein:
soil-impedance derivation is adjusted to changing soil conditions by running an impedance reset operation at least once for each irrigation cycle.

4. The method according to claim 3, wherein:
an impedance reset operation is performed immediately prior to start of irrigation fluid flow.

5. The method according to claim 1, wherein:
soil dryness conditions are derived by measurement of soil impedance between a pair of adjacent contacts at depth $Z_{BEGIN}$, and
soil-impedance derivation is adjusted to changing soil conditions by running an impedance reset operation after stopping irrigation fluid flow, and after a time delay directly associated with fluid uptake properties of the roots.

6. The method according to claim 5, wherein:
the time delay ranges between 5 hours and 20 hours.

7. The method according to claim 5, wherein:
the time delay lapses after 10 hours.

8. The method according to claim 1, wherein:
the irrigation-begin depth $Z_{BEGIN}$ is derived by utilizing the probe by taking at least one soil impedance measurement between each one of the adjacent contacts distributed along the probe, at least once after the irrigation fluid flow is stopped, $Z_{BEGIN}$ being detected within the MARL as a pronounced change in impedance.

9. The method according to claim 1, wherein:
the depth $Z_{end(i)}$ at which the flow of irrigation fluid is stopped at the first irrigation cycle i=0 is optionally entered into the control logic via the at least one I/O device, and
the depth $Z_{end(i)}$ is entered as any depth along the length of the probe, whereby a drainage front that descends below the depth of the probe for at least one irrigation cycle is an option.

10. The method according to claim 1, wherein:
the probe is built as a spike assembled out of a collection of elements selected in combination from the group of modular elements having hollow contact pieces, hollow spacers, cones, and covers, each element being configured to provide solid mechanical retention support and firm fastening in longitudinal coextensive succession with an adjacent element, the spike has at least four contact pieces, three spacers, one cone, and one cover, assembled to form one unitary rigid probe, and the hollow contact pieces and the hollow spacers provide a coextensive and unobstructed passage interior to the spike.

11. The method according to claim 1, wherein:

a dryness factor Y ranging from 1.1 to 2 is accepted as an initial value entered as either one of both a user input or a default, value, and a threshold for starting irrigation at the depth $Z_{BEGIN}$ is calculated by multiplication of the dryness factor Y by a reset resistance reading.

12. The method according to claim 1, wherein:

a front factor T ranging from 0.9 to 0.95, for tracking either one of both a wetness front and a drainage front, is accepted as an initial value entered as either one of both a user input or a default value, a threshold for ending irrigation at the depth $Z_{end\ (i)}$ is calculated by multiplication of the front factor T by a reset resistance reading, the depth $Z_{FINAL}$ is an initial value entered as either one of both a user input or a default value, and the threshold for ending irrigation may be adjusted at each irrigation cycle until the depth $Z_{FINAL}$ is reached.

13. The method according to claim 1, wherein:

the depth $Z_{FINAL}$ is an initial value entered as either one of both a user input or a default value, and the drainage front stop depth is detected at each next irrigation cycle, then compared to and adaptively adjusted if found different from the depth $Z_{FINAL}$.

14. A computer readable memory storing instructions that, when executed by a microprocessor cause the microprocessor to perform each of the method steps of claim 1.

15. A computer readable memory storing instructions that, when executed by a microprocessor cause the microprocessor to perform each of the method steps of claim 2.

16. A computer readable memory storing instructions that, when executed by a microprocessor cause the microprocessor to perform each of the method steps of claim 3.

17. A computer readable memory storing instructions that, when executed by a microprocessor cause the microprocessor to perform each of the method steps of claim 4.

18. A computer readable memory storing instructions that, when executed by a microprocessor cause the microprocessor to perform each of the method steps of claim 5.

19. A system for irrigation of vegetation configured to intimately associate supply of irrigation fluid in response to vegetation-rootage related properties and needs, by adaptively adjusting successive irrigation cycles i, with i=i [0,1,2, ... ,n], to converge toward a drainage fluid front arrest depth, comprising:

a control logic for operating and managing irrigation for a vegetation having a maximum activity root layer (MARL) spanning a range of soil depth, at least one probe for insertion into the soil, each at least one probe having a length and having a plurality of contacts longitudinally distributed in spaced-apart parallel alignment for deriving depth-related soil impedance data from the soil under command of the control logic, the at least one probe being coupled to the control logic via an electric circuit, at least one I/O device coupled to the control logic and allowing a user to input data, a controller running the control logic, and coupled to command both the at least one I/O device and an irrigation valve operative for starting and for stopping irrigation fluid flow to the vegetation to be irrigated, respectively at a depth $Z_{BEGIN}$ and at a depth $Z_{end(i)}$, wherein:

both $Z_{BEGIN}$ and $Z_{end(i)}$, are initial values entered as either one of both a user input or a default value, with $Z_{BEGIN}$ being disposed within the range of the MARL, and the depth $z_{end(i)}$ corresponding to a depth above a depth $Z_{FINAL}$, which is the depth below which a drainage front of the irrigation fluid should not descend, unless if so desired by a user, wherein:

operation of the control logic through the successive cycles i of irrigation for:

the irrigation-begin depth $Z_{BEGIN}$ being entered as a preset parameter into the control logic for a first cycle of irrigation, and in next cycles of irrigation, deriving from the at least one probe a depth $Z_{BEGIN}$ by taking resistance readings over the plurality of contacts to detect where changes in soil resistance measured over time increases fastest, which is where wetness uptake is most pronounced and indicates the depth $Z_{BEGIN}$, and for the depth $Z_{BEGIN}$ being entered as an initial value for a first cycle of irrigation, and next cycles of irrigation, deriving from the at least one probe a depth $Z_{end(i)}$ which is adaptively adjusted at each irrigation cycle to converge towards the depth $Z_{FINAL}$, until reached, whereby irrigation fluid flow is started in response to wetness uptake properties and needs of the roots of the vegetation in the MARL, and stopped before the drainage front reaches the depth $Z_{FINAL}$.

20. The system according to claim 19, wherein:

the depth $Z_{BEGIN}$, and the depth $Z_{FINAL}$ which is a control objective, are both entered as either one of both a user input into the control logic via the at least one I/O device and a default value, to provide rootage-property values necessary for operating and managing successive cycles of adaptive irrigation.

21. The system according to claim 19, wherein:

soil-impedance derivation is adjusted to changing soil conditions by running an impedance reset operation at least once for each irrigation cycle.

22. The system according to claim 21, wherein:

an impedance reset operation is performed just before starting irrigation fluid flow.

23. The system according to claim 19, wherein:

soil dryness conditions are derived by measurement of soil impedance between a pair of adjacent contacts at depth $Z_{BEGIN}$, and soil-impedance derivation is adjusted relatively to changing soil conditions by running an impedance reset operation after stopping irrigation fluid flow, and after a lapse of a delay for and directly associated with fluid absorption properties of the roots of the vegetation.

24. The system according to claim 23, wherein:

the time delay ranges between 5 hours and 20 hours.

25. The system according to claim 23, wherein:

the time delay lapses after 10 hours.

26. The system according to claim 19, wherein:

the irrigation-begin depth $Z_{BEGIN}$ is obtained via the probe by sampling at least one impedance measurement for each one of the successive pairs of contacts distributed along the probe, at least once after the irrigation fluid flow is stopped, the depth $Z_{BEGIN}$ being distinguished within the range of the MARL as a distinctive change in impedance.

27. The system according to claim 19, wherein:
the depth $Z_{end(i)}$ at which the flow of irrigation fluid is stopped at the first irrigation cycle i=0, is optionally entered into the control logic via the at least one I/O device as any depth along the length of the probe, whereby a drainage front that descends below the depth of the probe for at least one irrigation cycle is an option.

28. The system according to claim 19, wherein:
the probe is built as spike assembled out of a collection of elements selected in combination from the group of modular elements having hollow contact pieces, hollow spacers, cones, and covers, each element being configured to provide solid mechanical retention support and firm fastening in longitudinal coextensive succession with an adjacent element,
the spike has at least four contact pieces, three spacers, one cone, and one cover, assembled to form one unitary rigid probe, and
the plurality of hollow contact pieces and of hollow spacers provide a coextensive and unobstructed passage interior to the spike.

29. The system according to claim 19, wherein:
the depth $Z_{BEGIN}$ and a depth $Z_{FINAL}$ are entered into the control logic via the at leapt one I/O device, as two rootage-property related depth values necessary for operation of adaptive irrigation, and
the depth $Z_{end(i)}$ is adaptively adjusted by the control logic, at each irrigation cycle, for the irrigation fluid flow to stop at the depth $Z_{FINAL}$.

30. The system according to claim 19, wherein:
a dryness factor Y ranging from 1.1 to 2 is accepted as an initial value entered as either one of both a user input or a default value, and
a threshold for starting irrigation at the depth $Z_{BEGIN}$ is calculated by multiplication of the dryness factor Y by a reset resistance reading.

31. The system according to claim 19, wherein:
a front factor T ranging from 0.9 to 0.95, for tracking either one of both a wetness front and a drainage front, is accepted as an initial value entered as either one of both a user input or a default value,
a threshold for ending irrigation at the depth $Z_{end(i)}$ is calculated by multiplication of the front factor T by a reset resistance reading, the depth of $Z_{FINAL}$ is an initial value entered as either one of both a user input or a default value, and
the threshold for ending irrigation may be adjusted at each irrigation cycle until the depth $Z_{FINAL}$ is reached.

32. The system according to claim 19, wherein:
the depth $Z_{FINAL}$ is an initial value entered as either one of both a user input or a default value, and
the drainage front stop depth is detected at each next irrigation cycle, then compared to and adaptively adjusted if found different from the depth $Z_{FINAL}$.

* * * * *